US010452606B1

United States Patent
Armangau et al.

(10) Patent No.: US 10,452,606 B1
(45) Date of Patent: Oct. 22, 2019

(54) CONTINUOUS METADATA FORMATTING

(71) Applicant: EMC IP Holding Company LLC, Hopkinton, MA (US)

(72) Inventors: Philippe Armangau, Acton, MA (US); Rohit K. Chawla, Scotch Plains, NJ (US); Ahsan Rashid, Edison, NJ (US); Feng Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 412 days.

(21) Appl. No.: 15/280,377

(22) Filed: Sep. 29, 2016

(51) Int. Cl.
*G06F 7/00* (2006.01)
*G06F 17/30* (2006.01)
*G06F 16/11* (2019.01)
*G06F 3/06* (2006.01)
*G06F 16/172* (2019.01)

(52) U.S. Cl.
CPC .......... *G06F 16/11* (2019.01); *G06F 3/0604* (2013.01); *G06F 3/064* (2013.01); *G06F 3/0647* (2013.01); *G06F 3/0685* (2013.01); *G06F 16/172* (2019.01)

(58) Field of Classification Search
None
See application file for complete search history.

(56) References Cited

U.S. PATENT DOCUMENTS

| 8,204,871 | B1* | 6/2012 | Pawar | G06F 16/172 |
| | | | | 707/705 |
| 9,367,395 | B1 | 6/2016 | Bono et al. | |
| 2008/0307181 | A1* | 12/2008 | Kuszmaul | G06F 11/1471 |
| | | | | 711/164 |
| 2016/0026579 | A1* | 1/2016 | Samanta | G06F 12/0893 |
| | | | | 711/136 |

* cited by examiner

*Primary Examiner* — Tuan A Pham
(74) *Attorney, Agent, or Firm* — Muirhead and Saturnelli, LLC

(57) ABSTRACT

Metadata formatting techniques may include: receiving a request to allocate M blocks of a file system; selecting for allocation, using an allocation bitmap, M free blocks of the file system, wherein the M free blocks have corresponding block metadata (BMD) structures included in a BMD group stored in a first block of physical storage; determining whether the BMD group is stored in cache; determining, using the allocation bitmap, whether each BMD structure of the BMD group is unallocated; and responsive to determining the BMD group is not stored in cache and that each BMD structure of the BMD group is unallocated, performing first processing initializing the corresponding BMD structures for the M free blocks to denote the M free blocks are allocated. The first processing may include storing in the cache initialized versions of the corresponding BMD structures for the M free blocks.

15 Claims, 6 Drawing Sheets

CONTINUOUS METADATA FORMATTING

BACKGROUND

Technical Field

This application generally relates to data storage.

Description of Related Art

Systems may include different resources used by one or more host processors. Resources and host processors in the system may be interconnected by one or more communication connections, such as network connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the techniques herein is a method of performing metadata formatting comprising: receiving a request to allocate M blocks of a file system, M being an integer greater than zero; selecting for allocation, using an allocation bitmap, M free blocks of the file system, wherein the M free blocks have corresponding block metadata (BMD) structures included in a BMD group stored in a first block of physical storage; determining whether the BMD group is stored in cache; determining, using the allocation bitmap, whether each BMD structure of the BMD group is unallocated; and responsive to determining the BMD group is not stored in cache and that each BMD structure of the BMD group is unallocated, performing first processing to initialize the corresponding BMD structures for the M free blocks, said first processing including: storing in the cache initialized versions of the corresponding BMD structures for the M free blocks, wherein the initialized versions of the corresponding BMD structures denote that the M free blocks are allocated. The initialized versions of the corresponding BMD structures may be formatted in memory without reading the BMD group of BMD structures from physical storage. The allocation bitmap may include bits for a plurality of blocks of the file system, each of the bits denoting whether a corresponding one of the plurality of blocks is allocated or unallocated. Each of the M free blocks may be a block of physical storage of a RAID group provisioned for use by the file system. Each of the M free blocks may be allocated for use as a data block or an indirect block of a file of the file system. The file may denote a logical device having storage provisioned from the file system. The logical device may be a virtually provisioned logical device and the request may be performed responsive to an initial write to a logical address of the logical device to allocate physical storage for storing data of the initial write. The file may have a corresponding index node of the file system. The index node may include metadata for the file and the index node may include a mapping structure of one or more indirect blocks and one or more data blocks that are mapped, using the one or more indirect blocks, to the index node for the file. Each of the M free blocks may be allocated for use as either an indirect block or a data block for the file. Each of the M free blocks may be associated with a different one of the corresponding BMD structures including per block metadata for said each of the M free blocks. The method may include updating the allocation bitmap to indicate that the M free blocks are now allocated. The first block of physical storage including the BMD group may be non-volatile storage and the first block may have a first size denoting an I/O size granularity of I/O operations accessing data on the non-volatile storage. The BMD group may include a number of BMD structures having an aggregated size equal to the I/O size granularity. The M free blocks may be logically contiguous having M logically contiguous addresses in a RAID group providing storage for a file system. M may be any of equal to, or less than, the number of BMD structures of the BMD group.

In accordance with another aspect of techniques herein is a system comprising: a one or more processors; and a memory comprising code stored therein that, when executed by at least one of the one or more processors, performs a method of performing metadata formatting comprising: receiving a request to allocate M blocks of a file system, M being an integer greater than zero; selecting for allocation, using an allocation bitmap, M free blocks of the file system, wherein the M free blocks have corresponding block metadata (BMD) structures included in a BMD group stored in a first block of physical storage; determining whether the BMD group is stored in cache; determining, using the allocation bitmap, whether each BMD structure of the BMD group is unallocated; and responsive to determining the BMD group is not stored in cache and that each BMD structure of the BMD group is unallocated, performing first processing to initialize the corresponding BMD structures for the M free blocks, said first processing including: storing in the cache initialized versions of the corresponding BMD structures for the M free blocks, wherein the initialized versions of the corresponding BMD structures denote that the M free blocks are allocated.

In accordance with another aspect of techniques herein is a computer readable medium comprising code stored thereon that, when executed, performs a method of performing metadata formatting comprising: receiving a request to allocate M blocks of a file system, M being an integer greater than zero; selecting for allocation, using an allocation bitmap, M free blocks of the file system, wherein the M free blocks have corresponding block metadata (BMD) structures included in a BMD group stored in a first block of physical storage; determining whether the BMD group is stored in cache; determining, using the allocation bitmap, whether each BMD structure of the BMD group is unallocated; and responsive to determining the BMD group is not stored in cache and that each BMD structure of the BMD group is unallocated, performing first processing to initialize the corresponding BMD structures for the M free blocks, said first processing including: storing in the cache initialized versions of the corresponding BMD structures for the M free blocks, wherein the initialized versions of the corresponding BMD structures denote that the M free blocks are allocated. The initialized versions of the corresponding BMD structures may be formatted in memory without reading the BMD group of BMD structures from physical storage. The allocation bitmap may include bits for a plurality of blocks of the file system, each of the bits denoting whether a corresponding one of the plurality of blocks is allocated or unallocated. Each of the M free blocks may be a block of physical storage of a RAID group provisioned for use by the file system and wherein each of the M free blocks may be allocated for use as a data block or an indirect block of a file of the file system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
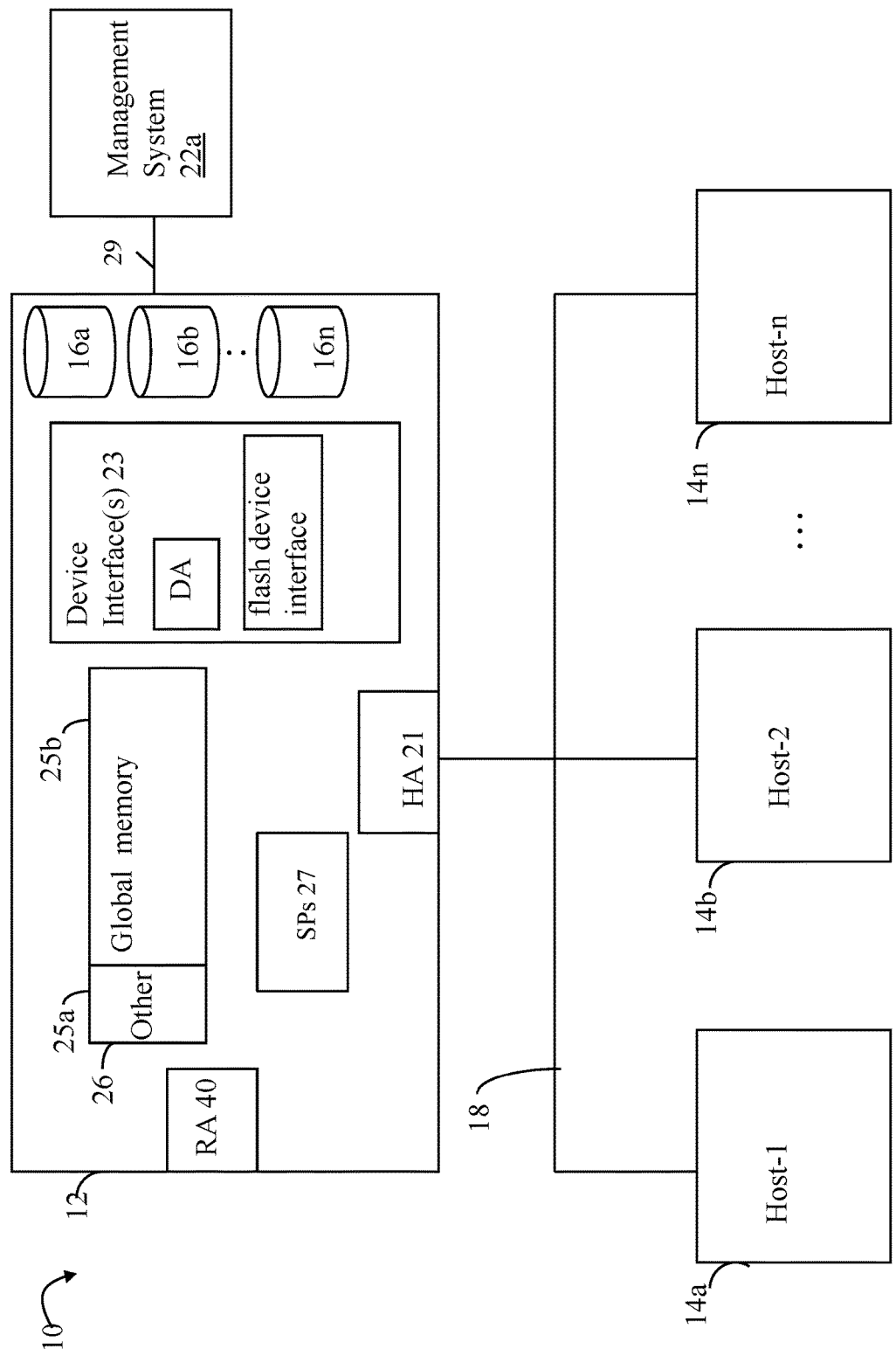
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14*a*-14*n* through communication medium 18. In this embodiment of the computer system 10, and the n hosts 14*a*-14*n* may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14*a*-14*n* may access and communicate with the data storage system 12, and may also communicate with other components included in the system 10.

Each of the host systems 14*a*-14*n* and the data storage system 12 included in the system 10 may be connected to the communication medium 18 by any one of a variety of connections as may be provided and supported in accordance with the type of communication medium 18. The processors included in the host computer systems 14*a*-14*n* may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14*a*-14*n* and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14*a*-14*n* may issue a data request to the data storage system 12 to perform a data operation. For example, an application executing on one of the host computers 14*a*-14*n* may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16*a*-16*n*. The data storage devices 16*a*-16*n* may include one or more types of physical data storage devices (PDs or physical devices) such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts.

The flash devices may be constructed using nonvolatile semiconductor NAND flash memory. The flash devices may include one or more SLC (single level cell) devices and/or MLC (multi level cell) devices.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration. For example, consistent with description elsewhere herein, an embodiment may define multiple storage tiers including one tier of PDs based on a first type of flash-based PDs, such as based on SLC technology, and also including another different tier of PDs based on a second type of flash-based PDs, such as MLC. Generally, the SLC PDs may have a higher write endurance and speed than MLC PDs.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22*a*. Alternatively, and more generally, the management software may execute on any suitable processor in any suitable system. For example, the data storage system management software may execute on a processor of the data storage system 12.

Each of the different adapters, such as HA 21, DA or disk interface, RA, and the like, may be implemented as a hardware component including, for example, one or more processors, one or more forms of memory, and the like. Code may be stored in one or more of the memories of the component for performing processing.

An embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

A data storage system may support one or more different types of logical devices presented to a host or other client as LUNs. For example, a data storage system may provide for configuration of thick or regular LUNs and also virtually provisioned or thin LUNs. A thick or regular LUN is a logical device that, when configured to have a total usable capacity such as presented to a user for storing data, has all the physical storage provisioned for the total usable capacity. In contrast, a thin or virtually provisioned LUN having a total usable capacity (e.g., a total logical capacity as published or presented to a user) is one where physical storage may be provisioned on demand, for example, as data is written to different portions of the LUN's logical address space. Thus, at any point in time, a thin or virtually provisioned LUN having a total usable capacity may not have an amount of physical storage provisioned for the total usable capacity. The granularity or the amount of storage provisioned at a time for virtually provisioned LUN may vary with embodiment. In one embodiment, physical storage may be allocated, such as a single allocation unit of storage, the first time there is a write to a particular target logical address (e.g., LUN and location or offset on the LUN). The single allocation unit of physical storage may be larger than the size of the amount of data written and the single allocation unit of physical storage is then mapped to a corresponding portion of the logical address range of a LUN. The corresponding portion of the logical address range includes the target logical address. Thus, at any point in time, not all portions of the logical address space of a virtually provisioned device may be associated or mapped to allocated physical storage depending on which logical addresses of the virtually provisioned LUN have been written to at a point in time.

In at least one embodiment, thin or virtually provisioned LUNs may be implemented with and organized as a type of mapped LUN. In such an embodiment, each thin LUN may be implemented as a file of a file system such as described, for example, in U.S. Pat. No. 9,367,395, Issued, Jun. 14, 2016, MANAGING DATA INCONSISTENCIES IN STORAGE SYSTEMS, Bono, et al., which is incorporated by reference herein. Following examples make reference to a thin LUN in connection with illustrating techniques herein. However, it will be appreciated by those of ordinary skill in the art that techniques herein are not limited to use with thin LUNs and may more generally be used in connection with other types of LUNs.

Figure 2:
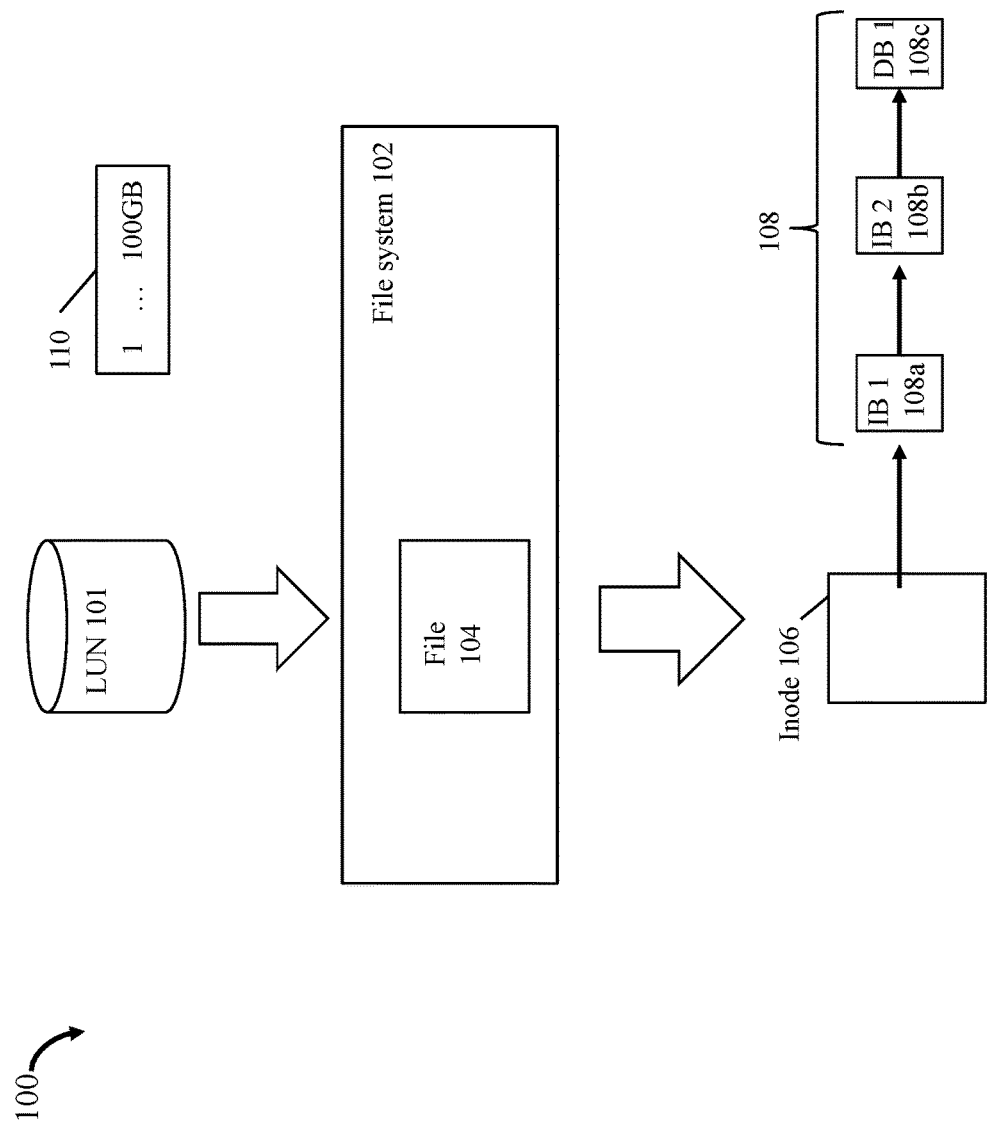
FIG. 2 is an example illustrating a thin or virtually provisioned LUN that may be implemented using a file in an embodiment in accordance with techniques herein.

Referring to FIG. 2, shown is an example 100 illustrating a thin LUN 101 that may be used in connection with an embodiment in accordance with techniques herein The example 100 includes LUN 101 implemented as file 104 on file system 102. The LUN 101 is a 100 GB capacity thin or virtually provisioned LUN having a logical address space as denoted by 110. In at least one embodiment, the 100 GB LUN 101 may be implemented using file 104 whereby the file 104 is a 100 GB file. In this manner, a relative file offset in 104 corresponds to a logical address or offset in the logical address space 110 of the LUN 101. Consistent with discussion elsewhere herein, physical storage for the thin LUN may be allocated in 8 kilobyte (KB) blocks in an on-demand manner. For example, the first time there is a write to a target logical address of the thin LUN's logical address space, the physical storage for the target logical address may be allocated and mapped to the thin LUN's logical address space. For example, a block of physical storage (at which the write data is stored) may be mapped to a particular block of the LUN's logical address space.

In at least one embodiment in accordance with techniques herein, file system 102 may be a UNIX-style file system. In such a file system, an index node (inode) is a data structure used to represent a filesystem object, such as a directory or file 104. In connection with thin LUN 101 implemented as file 104, the inode 106 for the file 104 stores various file attributes and a mapping structure 108 identifying the data block location(s) of the thin LUN. The data block locations may denote the allocated physical storage blocks for the thin LUN.

Generally, the inode 106 contains file metadata such as, for example, the size of the file, date of last modification, ownership, permissions, and the like. There is one inode for each file in the file system 102. Additionally, each inode such as inode 106 may be uniquely identified in the file system 102 by an inode number. The inode structure 106 also includes a tree structure 108, more generally referred to as a mapping structure 108. The structure 108 may include indirect blocks (IBs) which ultimately identify the data blocks (DBs) (e.g., physical storage locations) including the thin LUN data or contents. In 108, elements 108*a-b* denote IBs used to map to a single DB 108*c* that may correspond to a single block of the LUN 101 and its file 104. More generally, the structure 108 may include similar mappings between IBs and other DBs as physical storage is allocated for the thin LUN 101. The structure 108 may be characterized in one aspect as an address map that converts a logical address of the file (and thus of thin LUN 101) to a physical address (DB) of the file. It should be noted that an IB such as 108*a-b* may be an IB pointer that points to an indirect block that contains an array of block pointers (to either other IBs or to DBs). There may be many levels of IBs arranged in a hierarchy depending upon the size of a file where each level of IBs includes pointers to IBs at the next lower level. IBs may be considered metadata blocks in contrast to DBs which are data blocks.

In connection with the thin LUN 101 in at least one embodiment, the first time there is a write to a logical block address (LBA) of the LUN's logical address space 110, there is no existing data block or physical storage mapped to the LBA. As a result, in response to the first write to the LBA, physical storage in the form of a data block may be allocated and mapped to the LUN's logical address space. In this manner, the IBs and DBs of the tree structure 108 are also created in a dynamic manner as storage is allocated responsive to first writes to LBAs in the logical address space 110 of the thin LUN 101.

Figure 3:
FIG. 3 is an example illustrating a file system address space in an embodiment in accordance with techniques herein.

Referring to FIG. 3, shown is an example of a logical address space of a file system, such as file system 102 of FIG. 2, in an embodiment in accordance with techniques herein. The example 200 illustrates that the file system address space, such as of file system 102, may include address space mapped to DBs 202, IBs 204, inodes 206, and other metadata (MD) 208 used by the file system. Generally with reference back to FIG. 2, when thin LUN 101 is created, inode 106 may be allocated from the file system 102's address space portion 206. One or more writes to LUN 101 result in creating a portion of the tree or mapping structure 108 including allocated DBs from 202 and IBs from 204.

In at least one embodiment, space for the file system 102 may be provisioned in physical storage portions referred to as slices which are then mapped into the address space 200 of the file system 102. The file system 102 may then allocate blocks of storage for DBs, IBs, inodes, and other MD as needed. Physical storage for the file system may be provisioned in slices of storage from one or more RAID (redundant array of inexpensive disks) groups. A RAID group may be characterized as a logical storage entity defined from a group of physical storage devices, such as rotating disk drives, flash-based storage devices or other forms of non-volatile back end data storage devices. Physical devices of a RAID group are logically bound together to represent contiguous data storage space for applications. A RAID group represent a logically contiguous address space distributed across a set of physical storage devices of the group. Each physical storage device is subdivided into pieces used to spread the address space of the RAID group across the group (along with parity information if applicable to the RAID level). The physically contiguous pieces of the physical storage devices that are joined together to create the logically contiguous address space of the RAID group are called stripes. Stripes may form blocks and blocks may be allocated to create logical representations of storage space for use by applications within a data storage system. Each slice may denote an amount of storage, such as 256 MB (megabytes) although any suitable size may be used.

Figure 4:
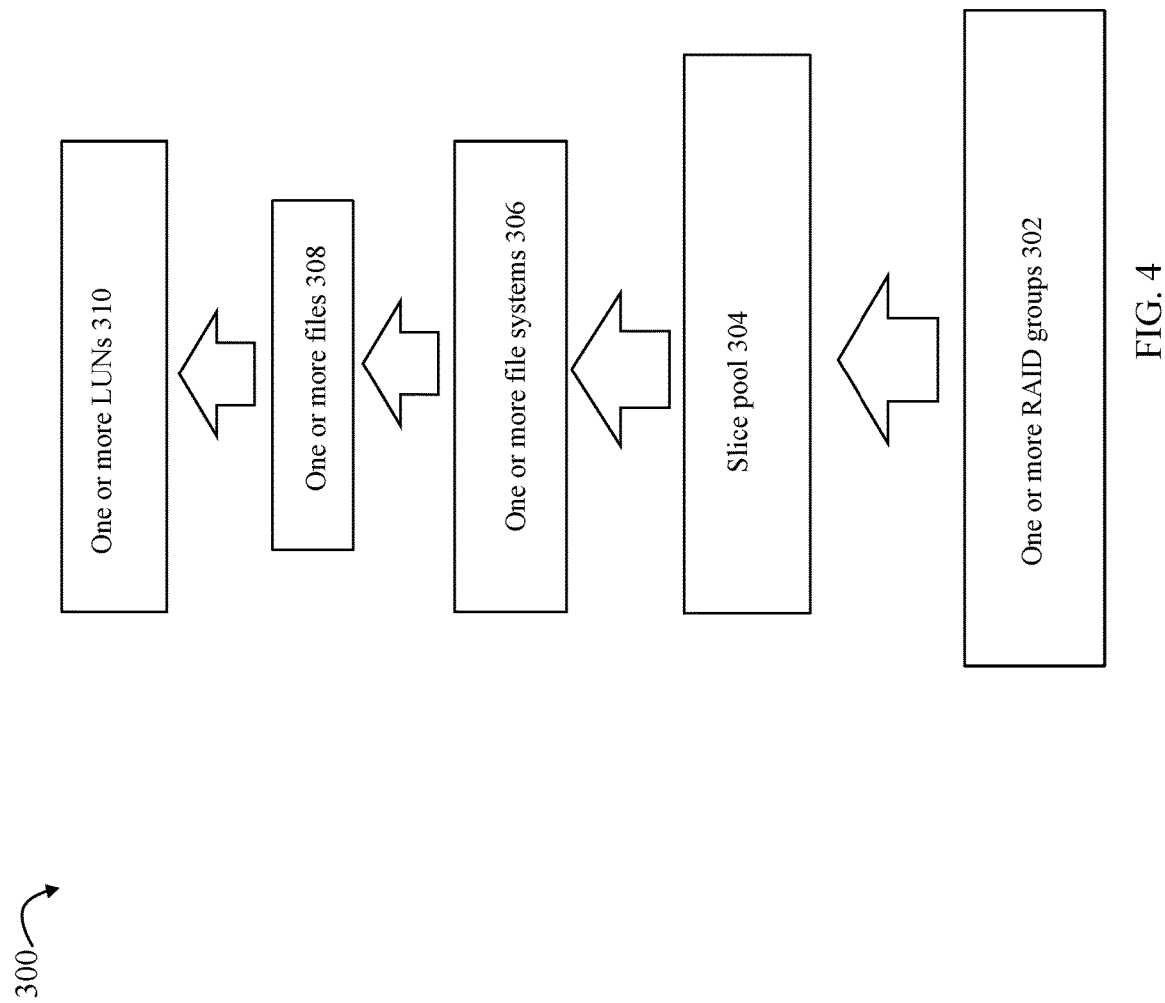
FIG. 4 is an example representation of different layers that may be used in implementing a LUN in an embodiment in accordance with techniques herein.

Referring to FIG. 4, shown is an example representing generally how storage may be configured for use with techniques herein. Element 302 denotes the one or more RAID groups as described above providing the physical storage from which slices of storage are allocated and included in slice pool 304. Slices from slice pool 304 may then be generally mapped, using possibly one or more other logical layers, into one or more file systems 306, such as file system 102 of FIG. 1. In each of the file systems of 306, one or more files 308 may be created to implement one or more corresponding LUNs 310. Consistent with other discussion herein, each file of 308 (e.g., 104 of FIG. 2) may implement a single corresponding LUN (e.g., LUN 101). U.S. Pat. No. 9,367,395, which is incorporated by reference herein, describes additional detail regarding how an embodiment may implement the layers of FIG. 4 and other aspects of techniques in an embodiment.

With reference back to FIG. 3, generally, in typical file systems, inodes, which include the metadata for a file, are stored alongside the data that comprises the content of the file in a physical storage media (e.g. disks) in a data storage system. As such, physical storage devices store both the user or file data itself and the file system metadata that is related to it. Further, each file system block of a file of a file system is associated with a per block metadata (also referred to herein as "BMD") that stores metadata (e.g., attributes related to sharing, checksum and the like) for that particular file system block and maintains information regarding the particular file system block. For example, the BMD for a DB may include the inode number of the file for the LUN having its data stored on the DB. The BMD for an allocated DB may identify the logical offset in the file for the LUN where the logical DB has been allocated for the logical offset.

In the example 200 of FIG. 3, the other MD 208 of the file system may include the BMD structures allocated and used by the file system. A different BMD is associated with each file system block, such as each IB and each DB. Additionally, the other MD 208 of the file system may also include one or more allocation bitmaps denoting which blocks of storage provisioned for the file system are allocated and which are unallocated (e.g., free or available for use by the file system). Each of the allocation bitmaps, also referred to as a cylinder group (CG), may be a bitmap for a logically contiguous sequence of physical storage blocks. A single CG may denote, for example, a logically contiguous sequence of physical storage blocks having a corresponding logically contiguous address space of a RAID group (e.g., such as may be included in a stripe of a RAID group). Thus, generally, blocks of physical storage mapped to the logically contiguous address space of a RAID group as included in 302 may be mapped to one or more CGs. In this manner, each block of physical storage that may be allocated or used by the file system 102 may have a corresponding bit in one of the CGs, or more generally, in an allocation bitmap. Each bit in the allocation bitmap may denote whether the associated physical storage block is currently allocated (e.g., bit=1) or is otherwise free and available for allocation (e.g., bit=0). Thus, the logically contiguous sequence of physical storage blocks may denote a sequence of logical addresses where the sequence denotes an order in which data may be written and stored on physical storage devices of the RAID group.

There may be a correspondence between the CGs or allocation bitmaps and associated BMD structures. In particular, an allocation bitmap of size N, N being a non-zero integer, may correspond to N logically contiguous addresses of physical storage blocks (e.g., for storing data not parity) of a RAID group. BMD structures corresponding to the N physical storage blocks may also be contiguously stored in physical storage blocks having an ordering corresponding to the N logically contiguous addresses. This is described in more detail below.

In connection with allocating an IB or DB, the allocation bitmap(s) of the file system may be consulted or queried to locate an unallocated/available storage block to be used. Additionally, when allocating an IB or DB, a BMD is allocated and initialized for use with the newly allocated IB or DB. In at least one embodiment, each BMD may be relatively small in size, such as 64 bytes, and each file system storage block may be 8K bytes so that 128 BMD structures may be stored in a single storage block. Additionally, in such an embodiment, the write granularity for the file system may be a single block or 8K bytes in this instance so that data is stored in the file system cache and written out/destaged to physical storage in single block units (e.g., single block also denotes the minimum size or amount of data that can be written in a single write to physical storage). In a similar manner, a single 8K byte block may be the read granularity when reading data from a physical storage device (e.g., single block also denotes the minimum size or amount of data that can be read from physical storage with a single read). With this in mind, each time only a single BMD structure needs to be updated, I/Os to read and/or write the single BMD structure are performed in chunks or units of a single 8K byte block. Put another way, I/Os to read and/or write the single BMD structure require performing such I/Os for all 128 BMD structures of the single 8K byte block including that particular single BMD structure.

Figure 5:
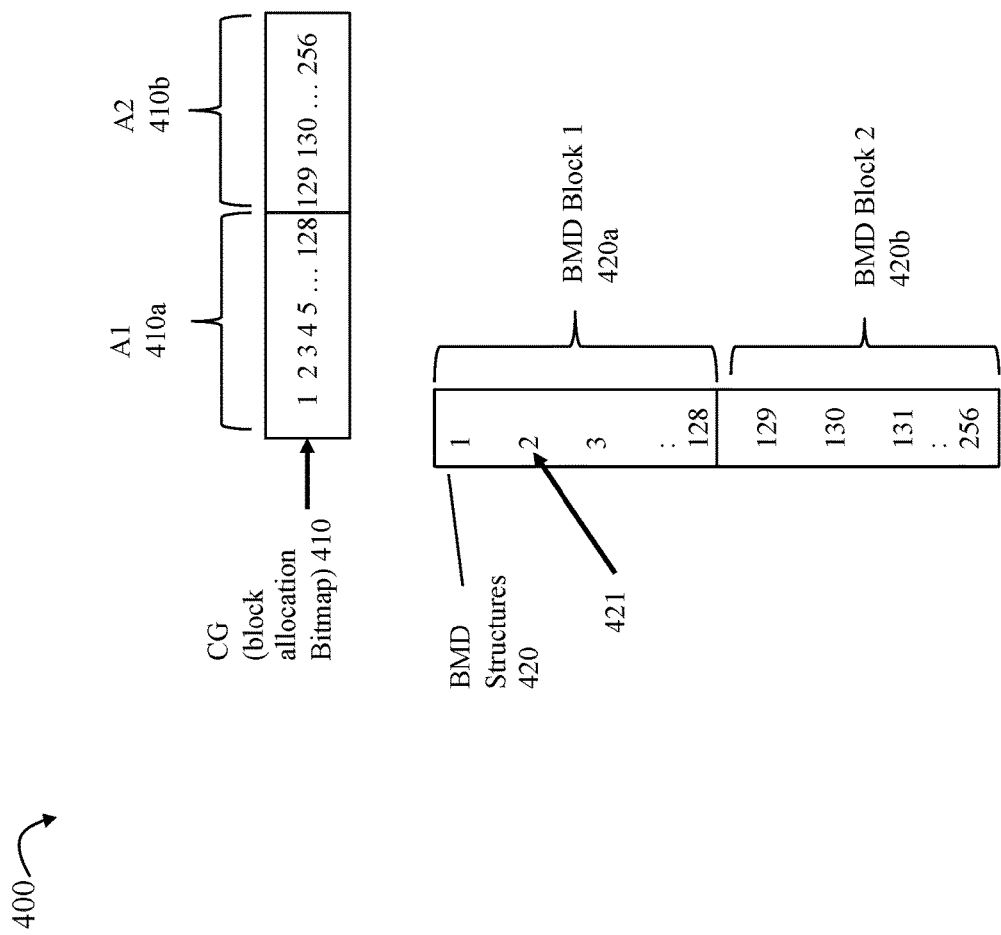
FIG. 5 is an example illustrating an allocation bitmap and corresponding block metadata (BMD) structures that may be used in an embodiment in accordance with techniques herein.

With reference to the example 400 of FIG. 5, shown is a CG or allocation bitmap 410 for 256 logically contiguous addresses of a RAID group mapped to a file system. In this example, assume a group of 128 BMD structures fit into a single physical storage block so that element 420 denotes the 256 BMD structures for the physical storage blocks having their corresponding allocation bits as denoted by 410. In 410, A1 410a denotes the allocation bitmap for logically contiguous block addresses 1 through 128, inclusively, of the RAID group; and A2 410b denotes the allocation bitmap for logically contiguous block addresses 129 through 256, inclusively, of the RAID group. Element 420 includes two blocks (or more generally two groups or data portions) of BMD structures—BMD block 1 420a and BMD block 2 420b. BMD block 1 420a includes a first group of 128 BMD structures corresponding, respectively, to logically contiguous block addresses 1 through 128 (e.g., 128 BMD structures corresponding to 128 logical contiguous addresses of the RAID group A1 410a). BMD block 2 420b includes a second group of 128 BMD structures corresponding, respectively, to logically contiguous block addresses 129 through 256 (e.g., 128 BMD structures corresponding to 128 contiguous logical addresses of the RAID group A2 410b). In this manner, there is a sequential ordering and contiguousness with respect to the RAID group logical addresses of physical storage blocks storing RAID group data where the foregoing ordering and contiguousness are reflected in corresponding allocation bit map locations and corresponding BMD structures. Thus, element 410 may denote the stored format or layout of the allocation bitmap for the 256 logically contiguous block addresses (1 . . . 256) of the RAID group (e.g., as stored on physical non-volatile storage and also stored in cache). Element 420 may denote the stored format or layout of the 256 BMD structures for the 256 logically contiguous block addresses (1 . . . 256) of the RAID group (e.g., as stored on physical non-volatile storage and also stored in cache). In connection with the example 400, reading and/or writing a single BMD structure of 420a, for example, requires reading and/or writing an entire group of 128 BMD structures of the block 420a.

Each element of 410 may be a bit, having a value of 1 if the corresponding physical storage block is allocated, and having value of 0 if otherwise where the corresponding physical storage block is unallocated. Assume, for example, processing is performed to allocate a physical storage block for an DB or IB. The allocation bitmap 410 may indicate that the block having logical address 2 of A1 410a is unallocated.

Processing may include updating the bitmap location for logical address 2 of A1 410 from unallocated to allocated (e.g., updated from 0 to 1).

Processing may also include initializing the BMD structure corresponding to the logical address 2 where the BMD structure for logical address 2 in this example is the second BMD structure (421) in BMD block 1 420a. In connection with initializing the BMD structure instance 421 for the newly allocated block, consider a first case where the BMD structure instance 421, and thus the entire BMD block 1 420a, is stored in cache (e.g., cache hit). In this first case, the cached copy of 420a may be updated so that the single BMD structure 421 is initialized for the newly allocated block. At a later point in time, the BMD block 1 420a as stored in cache is written out or destaged to physical (non-volatile) storage. As a second case, consider the scenario where the BMD structure instance 421, and thus the entire BMD block 1 420a, is not stored in cache resulting in a cache miss. In this second case, a read is performed to fetch from physical storage the 128 BMD structures of the entire BMD block 1 420a and store the fetched BMD block 1 420a in cache. Subsequently, the update may be performed to the cached copy of 420a to initialize the single BMD structure 421, and then write out or destage the updated cached copy of 420a (including the initialized BMD structure 421) to physical storage.

The foregoing describes processing as may be performed in a system not using the optimization techniques as described in following paragraphs. The foregoing may be performed in connection with each newly allocated block or blocks used as an IB or DB. What will now be described are techniques that may be performed in an embodiment with a goal of continuous metadata formatting. Such techniques avoid performing a read of the BMD block/group of BMD structures, such as in connection with a cache miss in the above-noted second case, when none of the physical storage blocks having corresponding BMD structures in the BMD block/group are allocated. When a block, such as used as an IB or DB, is allocated, its corresponding BMD may be initialized. In at least one embodiment, when a block used an IB or DB is freed or deallocated, the state of its BMD is not reset (e.g., its BMD is not reinitialized in connection with the block deallocation operation). As described herein, the state of whether a block is allocated or unallocated may be tracked in connection with another stored structure, the allocation bitmap or CG as described above. In connection with techniques herein when allocating one or more storage blocks having corresponding BMD structures covered by the same BMD block, a check may be made using the allocation bitmap to determine whether all of the storage blocks covered by the BMD block/group are unallocated. If none of the blocks covered by the BMD block are allocated, processing may omit reading the BMD block of BMD structures from physical storage since it is known, via the allocation bitmap, that there is no data for the BMD structures of the BMD block stored on physical storage (since all blocks covered by the BMD block are unallocated). In this manner, the read of the BMD block may be omitted and instead, the BMD structures of the BMD block may be formatted or initialized in memory and then stored in cache. At a later point in time, the initialized BMD structures of the BMD block may be written out or destaged to physical storage. It should be noted that such techniques may be generally applied for use when allocating any number of one or more storage blocks having corresponding BMD structures included in the same BMD block. Increased benefit of using the optimization techniques described herein may be obtained in embodiments which may continuously allocate large contiguous blocks of memory and then free or deallocate the large contiguous blocks of memory. For example, increased benefits of using the optimization techniques herein may be obtained in connection with a file system that performs stripe writes (e.g., writes in RAID group stripes). Performance benefits may be obtained by avoiding reading the BMD block from physical storage, for example, when allocating a large number of blocks such as allocating and deallocating 128 contiguous blocks rather than only allocating a single block as described above for purposes of illustration.

Figure 6:
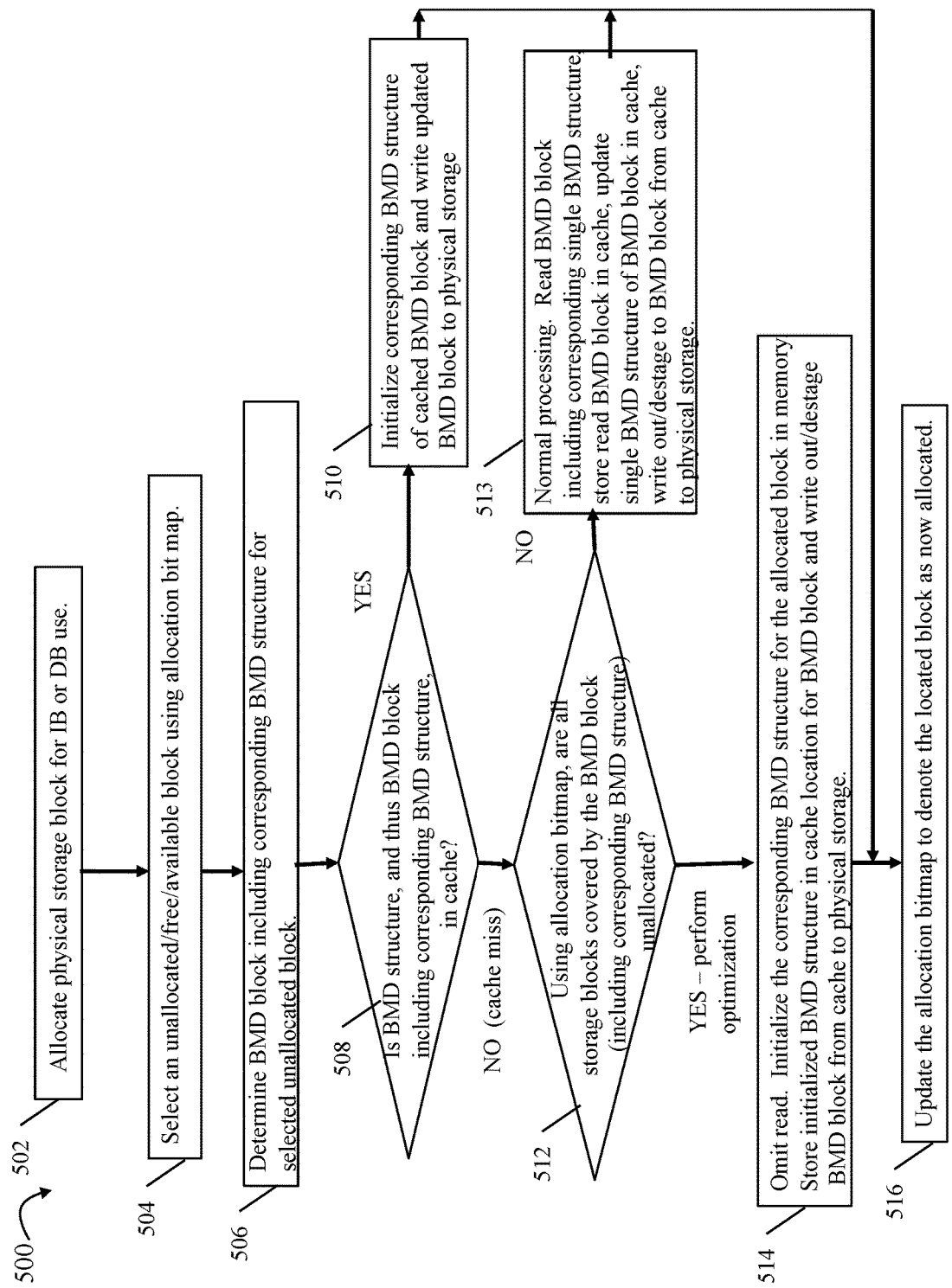
FIG. 6 is a flowchart of processing steps that may be performed in an embodiment in accordance with techniques herein.

Referring to FIG. 6, shown is a flowchart of processing that may be performed in an embodiment in accordance with techniques herein. The flowchart 500 summarizing processing described above illustrating the optimization performed in connection with omitting the reading of a BMD block having BMD structures corresponding to all unallocated blocks. The flowchart 500 illustrates processing in a general case where a single physical storage block is to be allocated for use as an IB or DB. More generally, the processing steps of 500 may be performed for any number of physical storage blocks being allocated contiguously where the number of blocks may be equal to or less than the number of BMDs stored in a single BMD block (denoting the I/O granularity).

At step 502, an operation is performed requiring allocation of a physical storage block for use as an IB or DB. At step 504, an unallocated (e.g., free or available) block may be selected using the allocation bit map. As described herein, an unallocated block may be denoted by having a corresponding bit value=0 in the bit map (e.g., bit value=1 denotes an allocated corresponding block). At step 506, processing is performed to determine the BMD block including the corresponding BMD structure corresponding to the selected unallocated block (selected in step 504). At step 508, a determination is made as to whether the corresponding BMD structure for the selected unallocated block, and thus the BMD block including the BMD structure, is in cache. If step 508 evaluates to yes indicating there is a cache hit with respect to the BMD block and thus the corresponding BMD structure, control proceeds to step 510. At step 510, processing includes updating the cached BMD block by initializing the corresponding BMD structure of the storage block selected for allocation and writing/destaging the updated BMD block (as stored in cache) to physical storage. From step 510, control proceeds to step 516.

If step 508 evaluates to no, it indicates there is a cache miss with respect to the corresponding BMD structure of the free block currently selected (in step 504) for allocation. Thus, the corresponding BMD structure and also the BMD block including the corresponding BMD structure, is not currently in cache. If step 508 evaluates to no, control proceeds to step 512. At step 512, a determination is made using the allocation bitmap as to whether all storage blocks covered by the BMD block (e.g., all storage blocks having corresponding BMD structures in the BMD block also including the corresponding BMD structure of the free block selected for allocation) are unallocated or free. If step 512 evaluates to no, control proceeds to step 513 where normal processing may be performed as described above. Step 513 may include: reading from physical storage all BMD structures of the BMD block that includes the corresponding BMD structure (for the block being allocated); storing the BMD block read in cache; updating by initializing the corresponding BMD structure of the BMD block in cache; and then writing out/destaging the BMD block from cache to physical storage. From step 513, control proceeds to step 516.

If step 512 evaluates to yes, processing proceeds to step 514 where optimization processing may be performed in accordance with techniques herein to omit reading from physical storage the BMD block including the corresponding BMD structure for the free block selected in step 504 for allocation. At step 514, processing may be performed to initialize the corresponding BMD structure for the newly allocated block in memory; store the initialized BMD structure in a cache location including the BMD block; and writing out/destaging the BMD block from cache to physical storage. In step 514, an in memory copy of the initialized, formatted BMD structure may be created, for example, in a temporary buffer where the temporary buffer contents are then stored in the cache location including the BMD structure and its associated BMD block. From step 514, control proceeds to step 516.

At step 516, processing is performed to update the allocation bitmap to denote the selected free block (selected in step 504) as now allocated. Step 516 may include updating a cached copy of the allocation bitmap and writing out/destaging the cached copy of the allocation bitmap to physical storage.

Consistent with discussion herein, the steps of FIG. 6 may be performed, for example, when allocating one or more blocks of storage (used as IBs and/or DBs) responsive to an initial first write to one or more particular logical addresses of a thin or virtually provisioned LUN, such as thin LUN 101 of FIG. 2 implemented as a mapped thin LUN using a file.

As noted above, the flowchart 500 includes steps where a single physical block may be allocated for use as a DB or IB. More generally, step 502 may be a request to allocate a contiguous number of blocks M (M being an integer greater than 0) where M is not greater than K (M≤K), where K is an integer denoting the number of BMD structures included in a single BMD block as stored on physical storage. In such an embodiment, reads and writes may be performed in units the size of the single BMD block. With reference back to FIG. 5 and discussion above, K may be 128 and the request may be to allocate up to M=128 contiguous blocks of storage. In an embodiment where step 502 generally denotes a request to allocate M contiguous blocks, step 504 may use the allocation bitmap to locate M free or unallocated contiguous blocks where such blocks may have corresponding BMD structures included in the same BMD block determined in step 506. To further illustrate, with reference back to FIG. 5, assume M is 128 and K is 128. Step 504 may determine using the allocation map 410 that all 128 blocks of A2 410b are unallocated or free (e.g., all bit entries of A2 410b=0). Step 506 may determine that BMD block 2 520b includes BMD structures for the selected 128 free blocks corresponding to A2 410b. Other steps 508, 510, 512, 513, 514 and 516 may be similarly modified as needed to apply to the number M contiguous blocks allocated.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing metadata formatting comprising:
   receiving a request to allocate one or more M blocks of a file system;
   selecting for allocation, using an allocation bitmap, M free blocks of the file system, wherein the M free blocks have M corresponding block metadata (BMD) structures included in a plurality of BMD structures stored in a same first block of physical storage, wherein each of the M free blocks is associated with a different one of the M corresponding BMD structures of the plurality of BMD structures that includes metadata describing said each of the M free blocks, wherein the allocation bitmap includes bits for a plurality of blocks of the file system, each of the bits denoting whether a corresponding one of the plurality of blocks is allocated or unallocated;
   determining that each BMD structure of the plurality of BMD structures stored in the same first block of physical storage is not stored in a cache;
   determining, using the allocation bitmap, that each BMD structure of the plurality of BMD structures stored in the same first block of physical storage is unallocated; and
   responsive to determining each BMD structure of the plurality of BMD structures stored in the same first block of physical storage is not stored in the cache and that each BMD structure of the plurality of BMD structures stored in the same first block of physical storage is unallocated, performing first processing to initialize the M corresponding BMD structures for the M free blocks, wherein the first processing omits reading the plurality of BMD structures of the same first block from physical storage and said first processing including:
      formatting initialized versions of the corresponding BMD structures in a memory; and
      storing, from the memory to the cache, the initialized versions of the corresponding BMD structures for the M free blocks, wherein the initialized versions of the corresponding BMD structures denote that the M free blocks are allocated.

2. The method of claim 1, wherein each of the M free blocks is a block of physical storage of a RAID group provisioned for use by the file system.

3. The method of claim 1, wherein each of the M free blocks is allocated for use as a data block or an indirect block of a file of the file system.

4. The method of claim 3, wherein the file denotes a logical device having storage provisioned from the file system.

5. The method of claim 4, wherein the file has a corresponding index node of the file system, the index node including metadata for the file and the index node including a mapping structure of one or more indirect blocks and one or more data blocks that are mapped, using the one or more indirect blocks, to the index node for the file.

6. The method of claim 5, wherein each of the M free blocks is allocated for use as either an indirect block or a data block for the file.

7. The method of claim 1, wherein the logical device is a virtually provisioned logical device and the request is performed responsive to an initial write to a logical address of the logical device to allocate physical storage for storing data of the initial write.

8. The method of claim 1, further comprising:
   updating the allocation bitmap to indicate that the M free blocks are now allocated.

9. The method of claim 1, wherein the same first block of physical storage including the plurality of BMD structures is non-volatile storage and the same first block has a first size denoting an I/O size granularity of I/O operations accessing data on the non-volatile storage.

10. The method of claim 9, wherein the plurality of BMD structures includes a number of BMD structures having an aggregated size equal to the I/O size granularity.

11. The method of claim 10, wherein the M free blocks are logically contiguous having M logically contiguous addresses in a RAID group providing storage for a file system.

12. The method of claim 11, where M is any of equal to, or less than, the number of BMD structures of the plurality of BMD structures.

13. A system comprising:
   one or more processors; and
   a memory comprising code stored therein that, when executed by at least one of the one or more processors, performs a method of performing metadata formatting comprising:
      receiving a request to allocate one or more M blocks of a file system;
      selecting for allocation, using an allocation bitmap, M free blocks of the file system, wherein the M free blocks have M corresponding block metadata (BMD) structures included in a plurality of BMD structures stored in a same first block of physical storage, wherein each of the M free blocks is associated with a different one of the M corresponding BMD structures of the plurality of BMD structures that includes metadata describing said each of the M free blocks, wherein the allocation bitmap includes bits for a plurality of blocks of the file system, each of the bits denoting whether a corresponding one of the plurality of blocks is allocated or unallocated;
      determining that each BMD structure of the plurality of BMD structures stored in the same first block of physical storage is not stored in a cache;
      determining, using the allocation bitmap, that each BMD structure of the plurality of BMD structures stored in the same first block of physical storage is unallocated; and
      responsive to determining each BMD structure of the plurality of BMD structures stored in the same first block of physical storage is not stored in the cache and that each BMD structure of the plurality of BMD structures stored in the same first block of physical storage is unallocated, performing first processing to initialize the M corresponding BMD structures for the M free blocks, wherein the first processing omits reading the plurality of BMD structures of the same first block from physical storage and said first processing including:
         formatting initialized versions of the corresponding BMD structures in a memory; and
         storing, from the memory to the cache, the initialized versions of the corresponding BMD structures for the M free blocks, wherein the initialized versions of the corresponding BMD structures denote that the M free blocks are allocated.

14. A non-transitory computer readable medium comprising code stored thereon that, when executed, performs a method of performing metadata formatting comprising:
   receiving a request to allocate one or more M blocks of a file system;
   selecting for allocation, using an allocation bitmap, M free blocks of the file system, wherein the M free blocks have M corresponding block metadata (BMD) structures included in a plurality of BMD structures stored in a same first block of physical storage, wherein each of the M free blocks is associated with a different one of the M corresponding BMD structures of the plurality of BMD structures that includes metadata describing said each of the M free blocks, wherein the allocation bitmap includes bits for a plurality of blocks of the file system, each of the bits denoting whether a corresponding one of the plurality of blocks is allocated or unallocated;
   determining that each BMD structure of the plurality of BMD structures stored in the same first block of physical storage is not stored in a cache;
   determining, using the allocation bitmap, that each BMD structure of the plurality of BMD structures stored in the same first block of physical storage is unallocated; and
   responsive to determining each BMD structure of the plurality of BMD structures stored in the same first block of physical storage is not stored in the cache and that each BMD structure of the plurality of BMD structures stored in the same first block of physical storage is unallocated, performing first processing to initialize the M corresponding BMD structures for the M free blocks, wherein the first processing omits reading the plurality of BMD structures of the same first block from physical storage and said first processing including:
      formatting initialized versions of the corresponding BMD structures in a memory; and
      storing, from the memory to the cache, the initialized versions of the corresponding BMD structures for the M free blocks, wherein the initialized versions of the corresponding BMD structures denote that the M free blocks are allocated.

15. The non-transitory computer readable medium of claim 14, wherein each of the M free blocks is a block of physical storage of a RAID group provisioned for use by the file system and wherein each of the M free blocks is allocated for use as a data block or an indirect block of a file of the file system.

* * * * *